United States Patent  [11] 3,629,006

| [72] | Inventor | Stanley Hill |
| --- | --- | --- |
| | | Cherry Hill, N.J. |
| [21] | Appl. No. | 29,293 |
| [22] | Filed | Apr. 16, 1970 |
| [45] | Patented | Dec. 21, 1971 |
| [73] | Assignee | ESB Incorporated |

[54] METHOD TO PROVIDE POSITIVE PLATE FOR LEAD-ACID STORAGE BATTERY CELLS
3 Claims, No Drawings

[52] U.S. Cl. .................................................... 136/27, 136/34, 136/76
[51] Int. Cl. .................................................... H01m 35/18, H01m 35/30
[50] Field of Search ........................................... 136/26–27, 34, 76–78; 320/2

[56] References Cited
UNITED STATES PATENTS

| 2,287,868 | 6/1942 | Daily | 136/78 |
| --- | --- | --- | --- |
| 2,650,257 | 8/1953 | Jolley | 136/34 |
| 2,658,097 | 11/1953 | Orsino | 136/27 |

OTHER REFERENCES

" Batterient" Vol. 17, number 3, June 1963, pages 472–482 (German Technical Magazine)

*Primary Examiner*—Anthony Skapars
*Attorneys*—Alfred J. Snyder, Jr., Robert H. Robinson, Raymond L. Balfour and Anthony J. Rossi ABSTRACT: Conventionally made, unformed storage battery plates comprised of a die-cast lead grid and a paste of lead oxide are preformed in a weakly acid or weakly alkaline electrolyte solution to provide a surface layer of lead peroxide high in alpha content on the active material of the plates. The formation of the plates is thereafter completed in a strongly alkaline electrolyte solution to provide plates having a formed active material of substantially all alpha lead peroxide.

METHOD TO PROVIDE POSITIVE PLATE FOR LEAD-ACID STORAGE BATTERY CELLS

BACKGROUND AND PURPOSE OF THE INVENTION

1. Field of the Invention

This invention relates to plates for storage battery cells. In particular, it relates to a method for obtaining an improved chemical composition in battery plates, namely, in the active material in positive plates for lead-acid storage battery cells.

2. Description of the Prior Art

It may be explained that in the manufacture of pasted lead-acid battery plates, it is customary to make a paste of lead oxide, sulfuric acid and water. This paste is smeared into a die-cast lead grid and allowed to dry and set. The resulting plate, at this stage of manufacture, is characterized as an unformed plate. The unformed plates are then given an electrical treatment in sulfuric acid. This treatment, known in the trade as "-formation," determines to a considerable degree the future behavior of the battery plates and particularly the behavior of the positive battery electrodes. In general, "formation" means the oxidation (of the positive plate) and reduction (of the negative plate) of the active materials which have been applied to the lead grids.

The advent of the X-ray spectrograph has enabled scientists to study the crystal structure of the lead-acid storage battery plate. As a result of such studies, it has been found that there are two types of lead peroxide ($PbO_2$), an alpha-type and a beta-type. The alpha-type is a physically stronger material than the beta-type and therefore its use is preferred in batteries, for batteries with the alpha-type of lead peroxide will inherently have a longer life than batteries with the beta-type of lead peroxide.

It is well-recognized that beta lead peroxide is produced when battery plates are given their formation charge in a strongly acidic solution, i.e., sulfuric acid having a specific gravity of about 1.150. It is also known that alpha-lead peroxide is produced on the plates when battery plates are formed in a basic solution, i.e. sodium hydroxide. Unfortunately, the lead oxide of the unformed plate dissolves quite readily in a basic solution and a plate formed in a sodium hydroxide solution actually loses about one-quarter of its active material during formation making the process economically unacceptable.

In order to get a maximum of alpha lead peroxide in plates intended for long life, it has been customary in industry to form the plates in a sulfuric acid solution having a specific gravity of about 1.050 with the pH of the solution being about 0.2 which, while characterized as a weak solution, is actually a very strongly acidic solution. By this latter process, it is possible to obtain measurable amounts of alpha peroxide, perhaps 5 to 10 percent. The plates so made are definitely better for deep cycling service than those formed in more concentrated acid, i.e. 1.150 sp. gr., and having no measurable alpha material.

It has been reported that formation in sodium sulfate or ammonium sulfate solutions will provide plates having up to about 50 percent alpha peroxide. The prior art on this subject is well-summarized in an article in the German technical magazine "Batterien" Vol. 17, no. 3, June 1963, pages 472 to 482.

SUMMARY OF THE INVENTION

In accordance with this invention, an unformed pasted lead-acid positive plate is given a preformation or an initial formation charge in a weakly acid or weakly basic solution. The final formation charge is then completed in a very strongly basic solution.

A first discovery leading to the method in accordance with this invention was that when formation conditions were such that alpha lead peroxide would be produced, the alpha-type material tended to be produced first on the surface of the plate, that is, at the formation electrolyte-active material interface, whereas when formation conditions were suitable for the production of beta-type lead peroxide, the beta-type material was produced first at the interface of the lead grid and the active material. Next, it was discovered that with even a thin layer of alpha-type lead peroxide produced on the plate such a layer was sufficient to protect the underlying lead oxide from attack by a basic electrolyte solution.

DESCRIPTION OF THE PREFERRED EMBODIMENT

The method in accordance with the invention provides improved positive pasted plates for lead-acid storage batteries and essentially comprises two formation steps. The first is an initial short formation charge under conditions suitable for producing a skin of lead peroxide high in alpha content over the surface of the plate without dissolving substantial amounts of the unformed lead oxide. The production of such a skin will occur in electrolyte solutions having a pH value of about 5 to about 9 and having temperatures within the range of 60° to 100° F. Normal current densities on the order of 0.02 to 0.2 amperes per square inch of plate surface are used in this initial formation step. For thicker plates, i.e. about 0.25 inch thick, the higher current densities should be used and for the thinner plates, i.e. about 0.060 inch thick, the lower values. A suitable electrolyte for this initial formation has been found to be 1.0 normal sodium sulfate solution.

This initial treatment should provide about one-sixth to one-third of the total formation ampere hours. Thus in terms of a normal formation charge at constant current lasting 36 hours, the initial formation charge should comprise the first 6 to 12 hours. The total formation ampere-hours is usually based upon the total weight of active material in a plate and values of 150 to 200 ampere-hours per pound are used in the industry. The total time of formation will be the total charge in ampere hours divided by the current.

The second step is the final formation or the completion of the formation of the plates in a strongly basic electrolyte solution. The pH of this final formation electrolyte should be greater than 9.0 with 13.0 to 14 preferred. A 1.0 normal sodium hydroxide solution has been found to be a suitable electrolyte for this step.

The current density for the final formation charge is normally the same as the initial formation current density. Thus in terms of the example above, the final formation charge should last 24 to 30 hours at the same rate as the preformation charge. However, the current density is not critical and for secondary reasons, such as temperature control, it may be desirable to use other values provided the total ampere hours of charge are held constant. The temperature of the final formation charge is normally kept within the range given for the initial formation charge.

After completing the formation charge, it is desirable to wash out the forming solution retained by the plate in water and then dry the plate in hot air.

Plates formed in accordance with the method of this invention contain substantially all lead peroxide of the alpha type within the analytical accuracy of the X-ray spectrograph. Also, a plate so made will have greater cycle life capabilities than plates formed in more conventional electrolyte. Further, and contrary to previous reports (see the above-cited publication), it has been found that the initial capacity of plates formed in accordance with the invention and containing substantially all lead peroxide of the alpha type have initial capacities nearly equal to plates containing entirely the softer beta-type lead peroxide. Although no firm explanation for this difference in reported performance has been found, it may be that the earlier experimenters did not consider the loss by dissolution of unformed lead oxide material.

EXAMPLE I

Plates containing approximately 97 gms. of dried unformed active material were formed in several electrolytes as follows:
Plate 1, formed in 1.050 sp. gr. sulfuric acid;
Plate 2, formed in 1.0 normal ammonium sulfate;
Plate 3, formed in 1.0 normal sodium sulfate for one-fourth the formation time and 1.0 normal sodium hydroxide for the remainder of the formation.

The formation schedule was:

Plate 1 & 2
- Initial formation charge: 8 hours at 1 ampere
- Rest: 4 hours
- Final formation charge: 28 hours at 1 ampere to give a total of 36 A.H.
- Wash in running water and dry in hot air.

Plate 3
- Initial formation charge: 8 hours at 1 ampere in 1.0 normal sodium sulfate. Change electrolyte to 1.0 normal sodium hydroxide.
- Rest: 4 hours
- Final formation charge: 28 hours at 1 ampere to give a total of 36 A.H.
- Wash and dry as above.

In terms of ampere-hours of charge per pound of dry active material, this is approximately 38 A.H. for the initial formation charge and 130 A.H. for the final formation charge.

The analysis of the plates so formed showed:

|  | Total Percent Lead Peroxide | Percent of $PbO_2$ in Alpha Form |
| --- | --- | --- |
| Plate 1 | 88.3 | 24.5 |
| Plate 2 | 92.8 | 61 |
| Plate 3 | 86.4 | 96.5 |

It will be seen from this test that the method of the invention produces a far higher percentage of alpha lead peroxide than other forming methods. It is to be noted that on further cycling the total quantity of lead peroxide in all samples was increased.

EXAMPLE II

Cells were built using plates formed according to Plate 1 and Plate 3 of Example I These cells were given a charge-discharge lift test. To accelerate the life test, the cells were made with a loose assembly and no retainers were put around the positive plates. The cycle test results were:

| Cycle | Plate 1 type | Plate 3 type |
| --- | --- | --- |
| 1 | 24.2 A.H. | 22.0 |
| 5 | 22.9 | 21.0 |
| 10 | 21.9 | 22.9 |
| 25 | 21.7 | 24.5 |
| 50 | 20.5 | 24.5 |
| 75 | 11.6 | 24.2 |
| 100 | 2.3 | 24.3 |

The improved life capability of the plate formed in accordance with this invention is clearly shown in this example.

These examples do not attempt to cover the possible ranges or types of electrolytes available to carry out this invention and it is to be understood that the invention is not limited to the electrolytes given as illustrations.

Having fully described my invention, I claim:

1. In a method of forming an unformed pasted lead plate to produce a formed positive plate for use in a lead-acid storage battery, the improvement comprising:
   a. initially forming the pasted lead plate in an electrolyte at a temperature within the range of 60° to 100° F., and having a pH of at least 5.0 but less than 9.0;
   b. finally forming the initially formed plate using an electrolyte having a pH greater than 9.0, the charge in ampere-hours delivered for the initial formation being about one-sixth to one-third of the total ampere-hours used for the final formation; and
   c. washing the plate until free of formation solution and drying the plate.

2. A process as defined in claim 1 in which the pH of the final formation solution is between 13.0 and 14.

3. A process as defined in claim 1 in which the solution of at least pH5 and less than pH9 is sodium sulfate and the solution of pH greater than 9.0 is sodium hydroxide.

* * * * *